United States Patent
Davis et al.

(10) Patent No.: US 8,190,757 B1
(45) Date of Patent: May 29, 2012

(54) SYSTEMS AND METHODS FOR AUTOMATICALLY BINDING CLIENT-SIDE APPLICATIONS WITH BACKEND SERVICES

(75) Inventors: Collin Davis, Redondo Beach, CA (US); George Stahl, Santa Monica, CA (US)

(73) Assignee: Symantec Corporation, Mountain View, CA (US)

( * ) Notice: Subject to any disclaimer, the term of this patent is extended or adjusted under 35 U.S.C. 154(b) by 208 days.

(21) Appl. No.: 12/415,444

(22) Filed: Mar. 31, 2009

(51) Int. Cl.
*G06F 15/16* (2006.01)

(52) U.S. Cl. ............... 709/229; 709/225; 726/5

(58) Field of Classification Search .................. None
See application file for complete search history.

(56) References Cited

U.S. PATENT DOCUMENTS

| | | | |
|---|---|---|---|
| 6,957,199 B1* | 10/2005 | Fisher | 705/78 |
| 7,016,875 B1* | 3/2006 | Steele et al. | 705/44 |
| 7,519,987 B1* | 4/2009 | Holt et al. | 726/2 |
| 2002/0016846 A1* | 2/2002 | Ono | 709/229 |
| 2003/0233422 A1* | 12/2003 | Csaszar et al. | 709/206 |
| 2004/0010685 A1* | 1/2004 | Sakaguchi et al. | 713/168 |
| 2005/0257058 A1* | 11/2005 | Yoshida et al. | 713/175 |
| 2006/0005234 A1* | 1/2006 | Birk et al. | 726/9 |
| 2006/0288230 A1* | 12/2006 | Crall et al. | 713/183 |
| 2009/0260060 A1* | 10/2009 | Smith et al. | 726/3 |

OTHER PUBLICATIONS

Henseler, Marcel et al. "Credential Management for Automatic Identification Solutions in Supply Chain Management." IEEE Transactions on Industrial Informatics. vol. 4, No. 4. Nov. 2008. IEEE Press. 303-314.*

* cited by examiner

*Primary Examiner* — Jeffrey R Swearingen
(74) *Attorney, Agent, or Firm* — Advantedge Law Group

(57) ABSTRACT

A system for automatically binding client-side applications with backend services is disclosed. This system may comprise a client device programmed to request, on behalf of a user, a client-side application and a backend service programmed to: 1) identify a client account associated with the user, 2) identify authentication credentials associated with the client account, 3) dynamically inject, in response to the request, the authentication credentials into the client-side application, and 4) provide the injected client-side application to the client device. Corresponding computer-implemented methods and computer-readable media are also disclosed.

20 Claims, 7 Drawing Sheets

SYSTEMS AND METHODS FOR AUTOMATICALLY BINDING CLIENT-SIDE APPLICATIONS WITH BACKEND SERVICES

BACKGROUND

Many new "cloud" services involve tying or binding client-side applications with a single backend management system. Examples of such services include, without limitation, MICROSOFT LIVE MESH, LOGMEIN, DROPBOX, and the like.

Unfortunately, the installation and setup process for conventional cloud services typically requires: 1) manually logging into a backend management system, 2) downloading a client-side application from the backend management system, 3) installing the client-side application on a local client device, and then 4) manually logging into the client-side application on the client device in order to associate the client-side application with the backend management system.

Unfortunately, this complex process may be unworkable in many consumer and enterprise environments. For example, in an enterprise environment, completing this installation and setup process for a large number of employees within the company may be both time consuming and difficult to implement. Similarly, in consumer environments, consumers may be unable to share multi-seat licenses for cloud-based software applications with friends or associates without disclosing their authentication credentials to their friends or associates. As such, the instant disclosure identifies a need for systems and methods for automatically, efficiently, and securely binding client-side applications with backend services.

SUMMARY

As will be described in greater detail below, the instant disclosure generally relates to systems and methods for automatically binding client-side applications with backend services. An exemplary method for performing such a task may comprise: 1) receiving, at a backend service, a request from a user to obtain a client-side application, 2) identifying a client account that is associated with the user, 3) identifying authentication credentials that are associated with the client account, 4) dynamically injecting, in response to the request, the authentication credentials into the client-side application (using, for example, execution-injection technology), and then 5) providing the injected client-side application to the user (by, for example, allowing the user to download the injected client-side application).

In some examples, the backend service may inject the authentication credentials into the client-side application without breaking or otherwise altering a digital signature of the client-side application. In addition to the authentication credentials, the backend service may also dynamically inject rules and/or policies into the client-side application for managing the functionality and use, respectively, of the client-side application.

In one example, the user may be an owner of the client account and the request may comprise a request to download the client-side application. In another example, the user may represent a user that has been associated with the client account by an owner of the account. For example, in an enterprise environment, an IT administrator of a company may associate employees of the company with the company's client account. Similarly, in a consumer environment, a consumer may associate one or more friends or associates with the consumer's multi-seat client account. In one example, owners of client accounts may associate additional users with their client accounts by logging into and interacting with the backend service.

In some examples, upon receiving a request from an owner of a client account to associate an additional user (such as an employee or friend) with the client account, the backend service may transmit, via email, a notification to the user that contains a hyperlink to a location for downloading the client-side application. After the user has downloaded and installed the injected client-side application, the client-side application may automatically attempt to bind itself with the backend service (without disclosing the account's sensitive authentication credentials to the user) by automatically transmitting the injected authentication credentials to the backend service. Upon receiving and validating the injected authentication credentials, the backend service may bind or associate the client-side application with the client account identified in the injected authentication credentials.

In some examples, the backend service may require that an owner of the client account approve any attempt to bind or associate client-side applications with the owner's account. In these examples, a user may be required to provide identifiable information (such as an email address or a personal message, such as "Hi John, this is Russ") in order to help the owner of the client account determine whether to approve the proposed bind or association. The backend service may also be configured to enable an owner of the client account to disassociate users from the owner's client account, rescind prior invitations to join the owner's account, associate additional users with the owner's account, and/or perform a variety of additional account-management operations.

In one example, the injected authentication credentials may expire either upon use or upon expiration of a predetermined period of time. In addition, in some examples the client-side application may avoid associating users with unintentional or undesired accounts by displaying a message during installation that identifies the account that is associated with the client-side application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
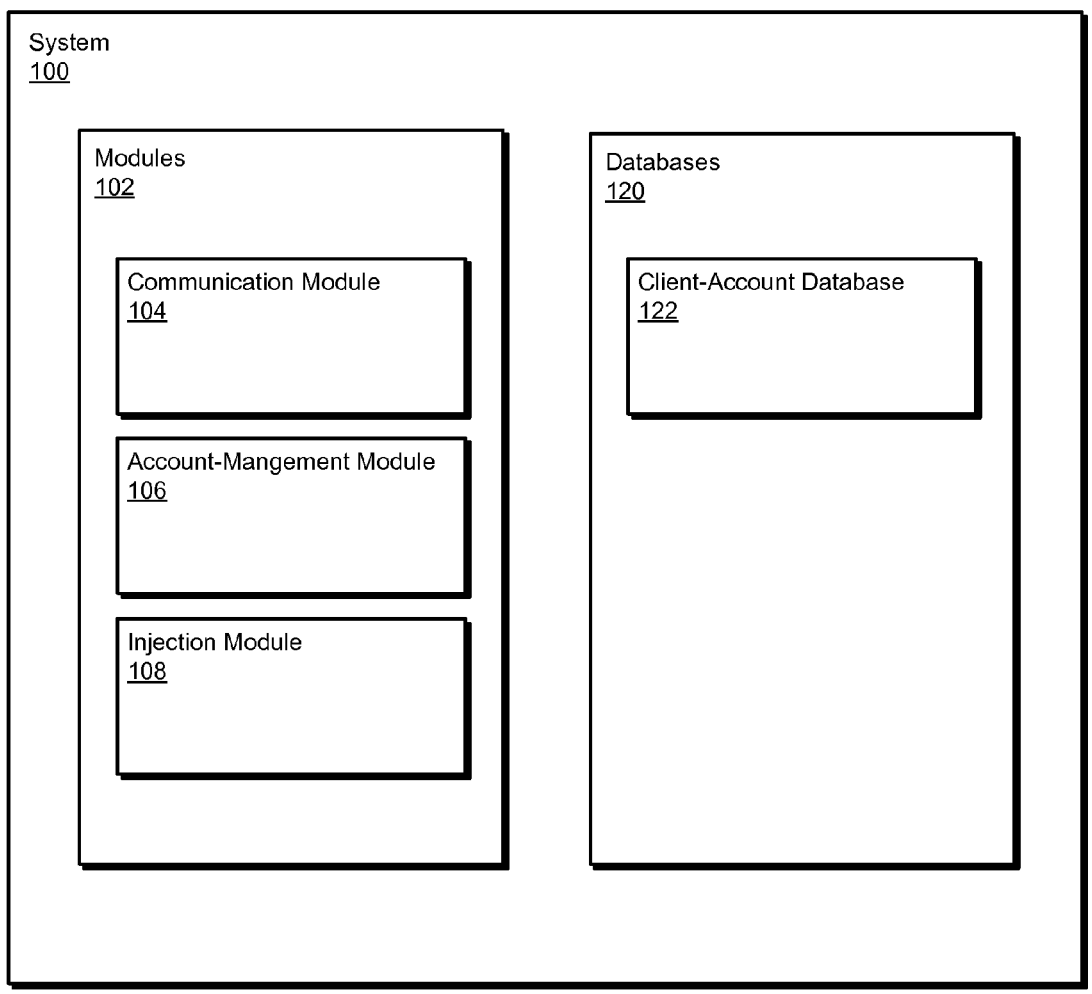
FIG. 1 is a block diagram of an exemplary system for automatically binding client-side applications with backend services according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for automatically binding client-side applications with backend services. As used herein, the phrase "client-side application" generally refers to any type or form of program, application, or system configured to access or communicate with a remote service. Similarly, the phrase "backend service," as used herein, generally refers to any type or form of centralized computing system or server configured to provide or manage remote services, applications, data, or the like.

Figure 2:
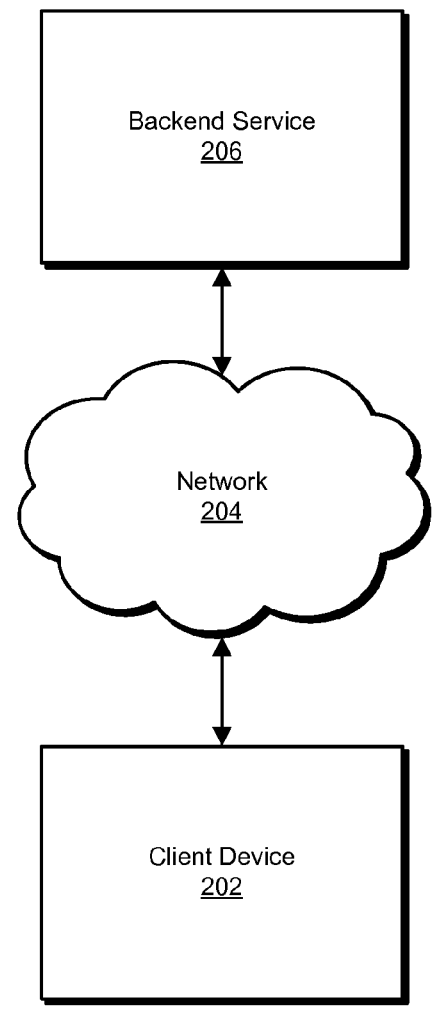
FIG. 2 is a block diagram of an exemplary system for automatically binding client-side applications with backend services according to an additional embodiment.

The following will provide, with reference to FIGS. 1-2, detailed descriptions of exemplary systems for automatically binding client-side applications with backend services. Detailed descriptions of corresponding computer-implemented methods will be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for automatically binding client-side applications with backend services. As illustrated in this figure, exemplary system 100 may comprise one or more modules for performing one or more tasks. For example, and as will be explained in greater detail below, exemplary system 100 may comprise a communication module 104 programmed to facilitate communication between a client device and a backend service (e.g., client device 202 and backend service 206 in FIG. 2). Exemplary system 100 may also comprise an account-management module 106 programmed to manage client accounts associated with backend services.

In addition, and as will be described in greater detail below, exemplary system 100 may comprise an injection module 108 programmed to dynamically inject rules, policies, and/or authentication credentials associated with client accounts into client-side applications. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., client device 202 and/or backend service 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also comprise one or more databases 120. Databases 120 may represent portions of a single database or computing device or a plurality of databases or computing devices. In one embodiment, exemplary system 100 may comprise a client-account database 122 for storing information regarding client accounts, owners of such client accounts, and users that are associated with such client accounts. In one example, client-account database 122 may represent a relational database.

Databases 120 in FIG. 1 may represent a portion of one or more computing devices. For example, databases 120 may represent a portion of backend service 206 in FIG. 2, computing system 610 in FIG. 6, and/or portions of exemplary network architecture 700 in FIG. 7. Alternatively, databases 120 in FIG. 1 may represent one or more physically separate devices capable of being accessed by a computing device, such as backend service 206 in FIG. 2, computing system 610 in FIG. 6, and/or portions of exemplary network architecture 700 in FIG. 7.

FIG. 2 is a block diagram of an exemplary system 200 for automatically binding client-side applications with backend services. As illustrated in this figure, exemplary system 200 may comprise a client device 202 in communication with a backend service 206 via a network 204. In one embodiment, and as will be described in greater detail below, client device 202 may be programmed to request, on behalf of a user, a client-side application from backend service 206. In response, backend service 206 may: 1) identify a client account associated with the user, 2) identify authentication credentials associated with the client account, 3) dynamically inject, in response to the request, the authentication credentials into the client-side application, and then 4) provide the injected client-side application to the client device.

Client device 202 generally represents any type or form of computing device capable of reading computer-executable instructions. Examples of client device 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Backend service 206 generally represents any type or form of computing device that is capable of dynamically injecting authentication credentials into client-side applications. Examples of backend service 206 include, without limitation, application servers and database servers configured to provide various database services and/or run certain software applications.

Network 206 generally represents any medium or architecture capable of facilitating communication or data transfer. Examples of network 206 include, without limitation, an intranet, a wide area network (WAN), a local area network (LAN), a personal area network (PAN), the Internet, power line communications (PLC), a cellular network (e.g., GSN Network), exemplary network architecture 700 in FIG. 7, or the like. Network 206 may facilitate communication or data transfer using wireless or wired connections. In one embodiment, network 206 may facilitate communication between client device 202 and backend service 206.

Figure 3:
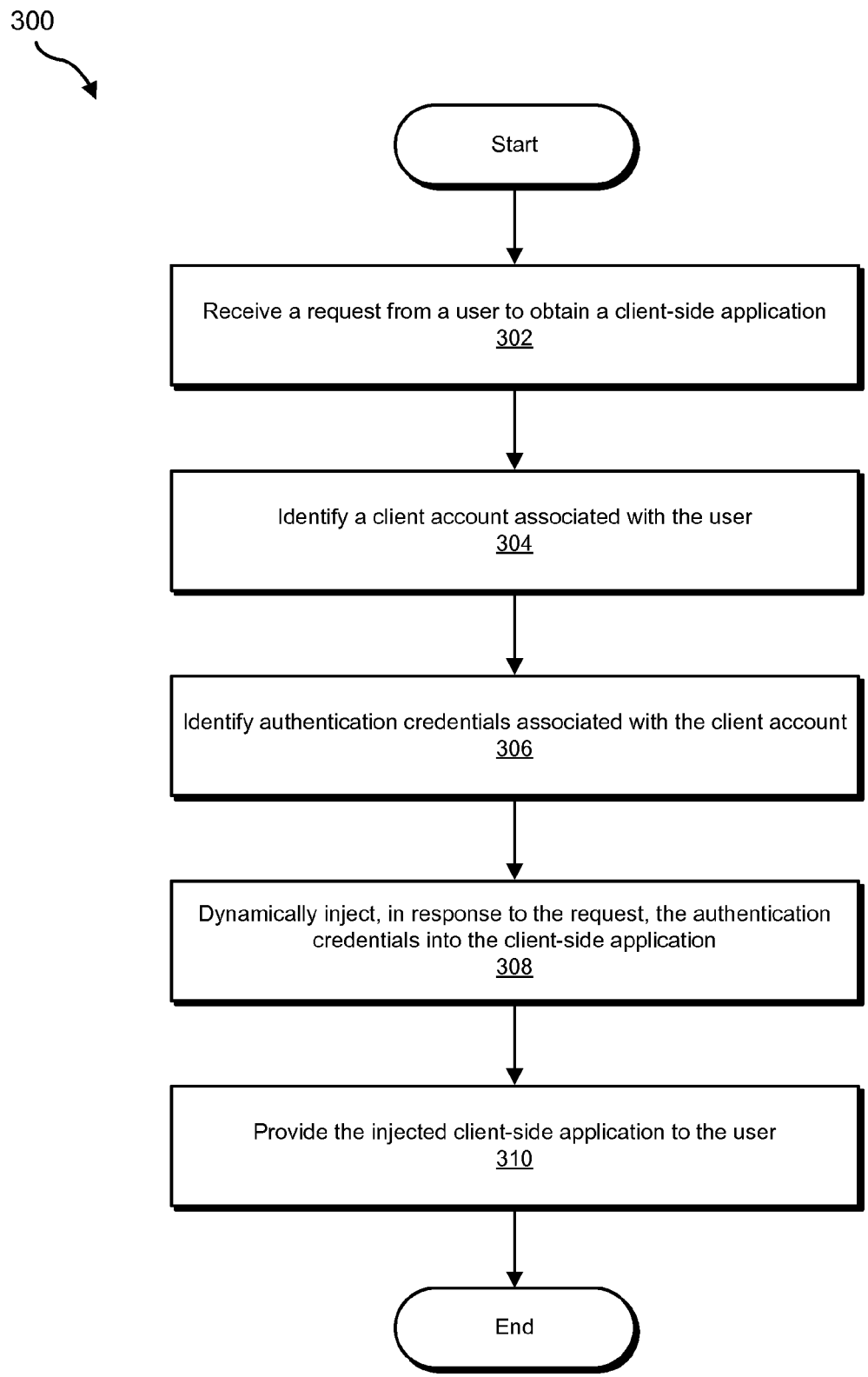
FIG. 3 is a flow diagram of an exemplary server-side method for automatically binding client-side applications with backend services.

FIG. 3 is a flow diagram of an exemplary computer-implemented method 300 for automatically binding client-side applications with backend services. As illustrated in this figure, at step 302 the system may receive a request from a user to obtain a client-side application that is associated with a backend service. For example, backend service 206 in FIG. 2 (which may, as detailed above, comprise communication module 104 in FIG. 1) may receive, from client device 202, a request from a user of client device 202 to obtain a client-side application.

In one example, the request received in step 302 may originate from an owner of a client account associated with backend service 206. In this example, the request received in step 302 may represent a request from the owner of the client account to download a client-side application that is associated with the owner's client account. For example, a consumer that has purchased a license for a software application having an associated backend component (such as a security-software program that regularly communicates with a backend service to retrieve or obtain updated malware-detection heuristics and fingerprints) may, after logging into a backend server, request to download the software application from the backend server.

In an additional example, the request may originate from a user that has been associated with a client account by an owner of the client account, as will be described in greater detail below. For example, in the context of an enterprise environment, the user may represent an employee of a company that has been associated with the company's client account by an IT administrator of the company. In this example, the company's IT administrator may associate the employee with the company's client account by logging into a backend server and adding the employee to the company's client account. Upon receiving the request from the IT administrator to associate the employee with the company's client account, the backend server may transmit, via e-mail, a notification to the employee that contains a hyperlink to a location for downloading a software application that is associated with the company's client account.

Similarly, in a consumer environment, the user may represent a friend or associate of a consumer that has purchased a multiple-seat license for a software application having an associated backend component (such as a security-software program that regularly communicates with a backend service to retrieve or obtain updated malware-detection heuristics and fingerprints). In this example, the consumer (i.e., the owner of the client account) may share his/her multiple-seat license with a friend or associate by logging into a backend server and requesting that the server associate the friend or associate with the consumer's client account. Upon receiving the request from the consumer to associate the friend or associate with consumer's client account, the server may transmit, via e-mail, a notification to the friend or associate of the consumer that contains a hyperlink to a location for downloading the software application that is associated with the consumer's client account.

In some examples, the request received in step 302 may contain identification information for the user. For example, in an enterprise environment, the request may contain information that identifies the employee's ID number, e-mail address, or the like. Similarly, in a consumer environment, the request may contain information that identifies the name of the consumer's friend or associate, an e-mail address of the friend or associate, or, as will be explained in greater detail below, a message from the friend or associate that may help the consumer identify the friend or associate (e.g., "Hi John, this is Russ").

Returning to FIG. 3, at step 304 the system may identify a client account associated with the user identified in the request received in step 302. For example, backend service 206 in FIG. 2 (which may, as detailed above, comprise account-management module 106 in FIG. 1) may, by analyzing client-account database 122, identify a client account that is associated with the user identified in the request received in step 302.

For example, if the user represents an owner of the client account, then backend service 206 may identify a client account associated with the owner by requiring that the owner of the client account log into backend service 206. Alternatively, if the user represents a user that has been associated with the client account by an owner of a client account (such as an employee that has been associated with a company's account or a friend or associate that has been associated with a consumer's account), then backend service 206 may identify the client account associated with the user by querying client-account database 122 (which may, as detailed above, represent a relational database that contains information that identifies client accounts, owners of such client accounts, and users that are associated with such client accounts).

At step 306, the system may identify authentication credentials that are associated with the client account identified in step 304. For example, backend service 206 in FIG. 2 (which may, as detailed above, comprise account-management module 106 in FIG. 1) may identify authentication credentials that are associated with the client account identified in step 304.

The system may perform step 306 in a variety of ways. For example, if the request received in step 302 originates from an owner of the client account, then the system may identify authentication credentials that are associated with the client account by requesting and receiving authentication credentials from the owner of the client account (through, for example, a login or other authentication process). Alternatively, if the request received in step 302 originates from a user that has been associated with a client account by an owner of the client account, then the system may identify authentication credentials associated with the client account by querying and retrieving these authentication credentials from a database (such as client-account database 122 in FIG. 1).

Figure 4:
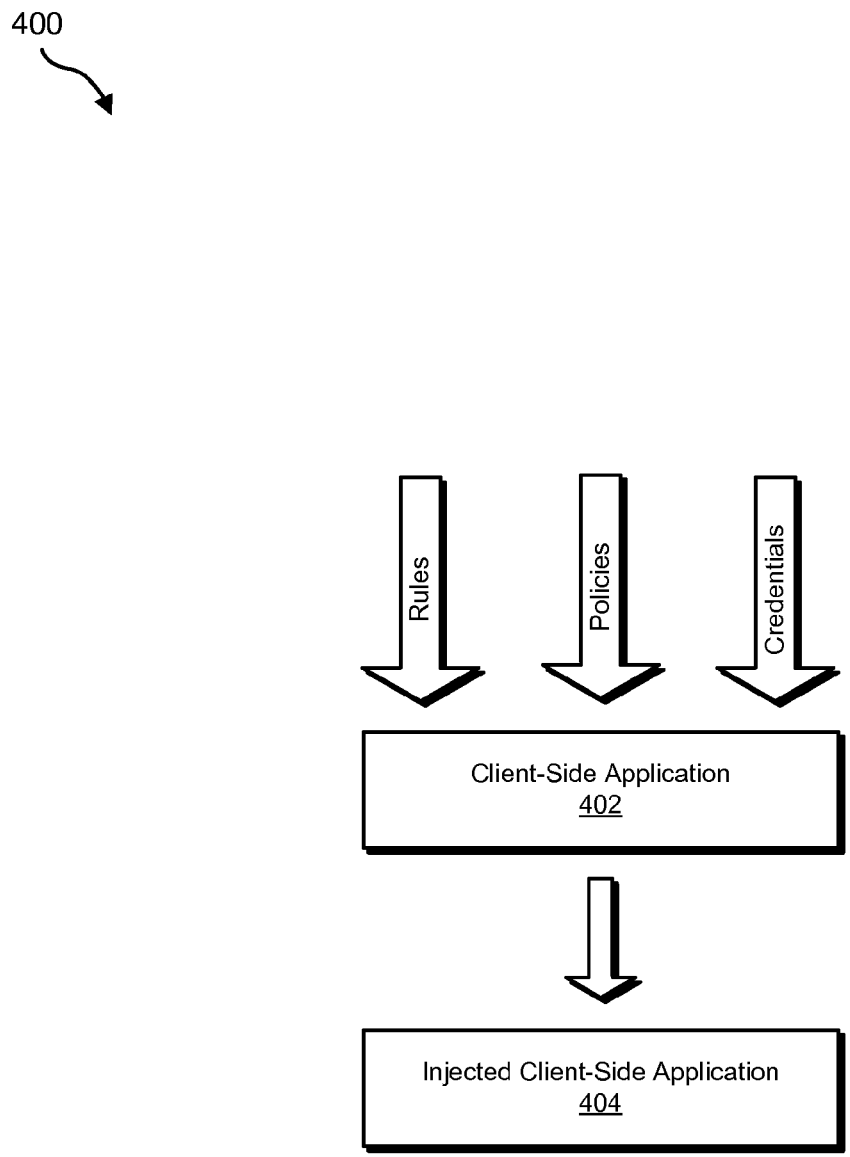
FIG. 4 is an illustration of an exemplary method for injecting rules, policies, and/or authentication credentials into a client-side application.

At step 308, the system may dynamically inject, in response to the request received in step 302, the authentication credentials identified in step 306 into the requested client-side application. For example, backend service 206 in FIG. 2 (which may, as detailed above, comprise injection module 108 in FIG. 1) may, as illustrated in FIG. 4, inject authentication credentials (received, for example, from an owner of the client account or retrieved from client-account database 122) into the requested client-side application 402.

The system may inject authentication credentials into client-side applications in a variety of ways. In one example, the system may utilize execution-injection technology to inject the authentication credentials into the client-side application without altering or breaking a digital signature that is associated with the client-side application.

In some embodiments, the system may also inject additional data into the client-side application. For example, and as illustrated in FIG. 4, the system may inject rules and/or policies for managing the functionality and use, respectively, of client-side application 402. Examples of rules that may be injected to manage the functionality of a client-side application include, without limitation, IT rules such as a rule that prevents a user of a security-software application from disabling virus-scanning capabilities of the security-software application, a rule that turns on and automatically configures a firewall service provided by a security-software application, or any other rule that may be used to manage functionality of the client-side application.

Similarly, examples of policies that may be injected into a client-side application to manage the use of the client-side application include, without limitation, policies that dictate procedures to follow when authentication credentials injected into the client-side application expire or are rejected by a backend service (as will be discussed in greater detail below), how authentication credentials that are injected into the client-side application should be managed, or any other policy that may manage use of any aspect of the client-side application.

Returning to FIG. 4, at step 310 the system may provide the injected client-side application to the user identified in the request received at step 302. For example, backend service 206 in FIG. 2 (which may, as detailed above, comprise communication module 104 in FIG. 1) may transmit injected client-side application 404 in FIG. 4 to client device 202 in FIG. 2 via network 204. Upon completion of step 310, exemplary method 308 in FIG. 3 may terminate.

Although not illustrated in FIG. 3, in some examples exemplary method 300 may also comprise: 1) receiving, from a client device, authentication credentials that have been injected into a client-side application installed on the client device and then 2) determining whether to associate the client-side application that transmitted the authentication credentials with a client account identified in the authentication credentials. For example, backend service 206 in FIG. 2 may receive (via communication module 104 in FIG. 1) authentication credentials for a client account from client device 202. Account-management module 106 in FIG. 1 may then cause backend service 206 to determine, by querying client-account database 122 in FIG. 1, whether the account credentials are legitimate. If backend service 206 determines that the account credentials are legitimate, then backend service 206 may associate the client-side application on client device 202 with the client account identified in the authentication credentials by, for example, transmitting an association-acceptance notice to the client-side application on client device 202.

Alternatively, if backend service 206 determines that the authentication credentials are not legitimate (e.g., if the account credentials have expired or if the account credentials have been rescinded or revoked by an owner of the client account), then backend service 206 may decline to associate the client-side application on client device 202 with the client account identified in the authentication credentials by, for example, transmitting an association-rejection notice to the client-side application on client device 202.

In some examples, backend service 206 in FIG. 2 may, prior to associating a client-side application with the client account, require that an owner of the client account approve the association. For example, upon receiving authentication credentials from a client-side application installed on client device 202 in FIG. 2, backend service 206 may transmit, via e-mail, a notification to an owner of the client account identified in the identification credentials. In some examples, this notification may contain information that: 1) identifies the association in question and 2) instructs the owner to log into backend service 206 to approve or deny the proposed association. Examples of information that may be used to identify the proposed association that may be contained in such a notification include, without limitation, information that identifies a user of client device 202, such as a personal message from a user of client device 202 (e.g., "Hi John, this is Russ"), information regarding the number of remaining license seats for the client account, or any other information that may be useful or helpful to the owner of the client account in determining whether to approve or deny the proposed association.

In some examples, account-management module 106 in FIG. 1 may enable an owner of a client account to manage various aspects of his/her client account by logging into backend service 206 in FIG. 2. For example, account-management module 106 in FIG. 1 may enable an owner of a client account to: 1) disassociate users from the owner's client account (by, for example, rescinding prior invitations to join the client account, declining attempts by uninvited guest to join the client account, or the like), 2) associate additional users with the owner's client account, or 3) perform any other account-management operation.

Figure 5:
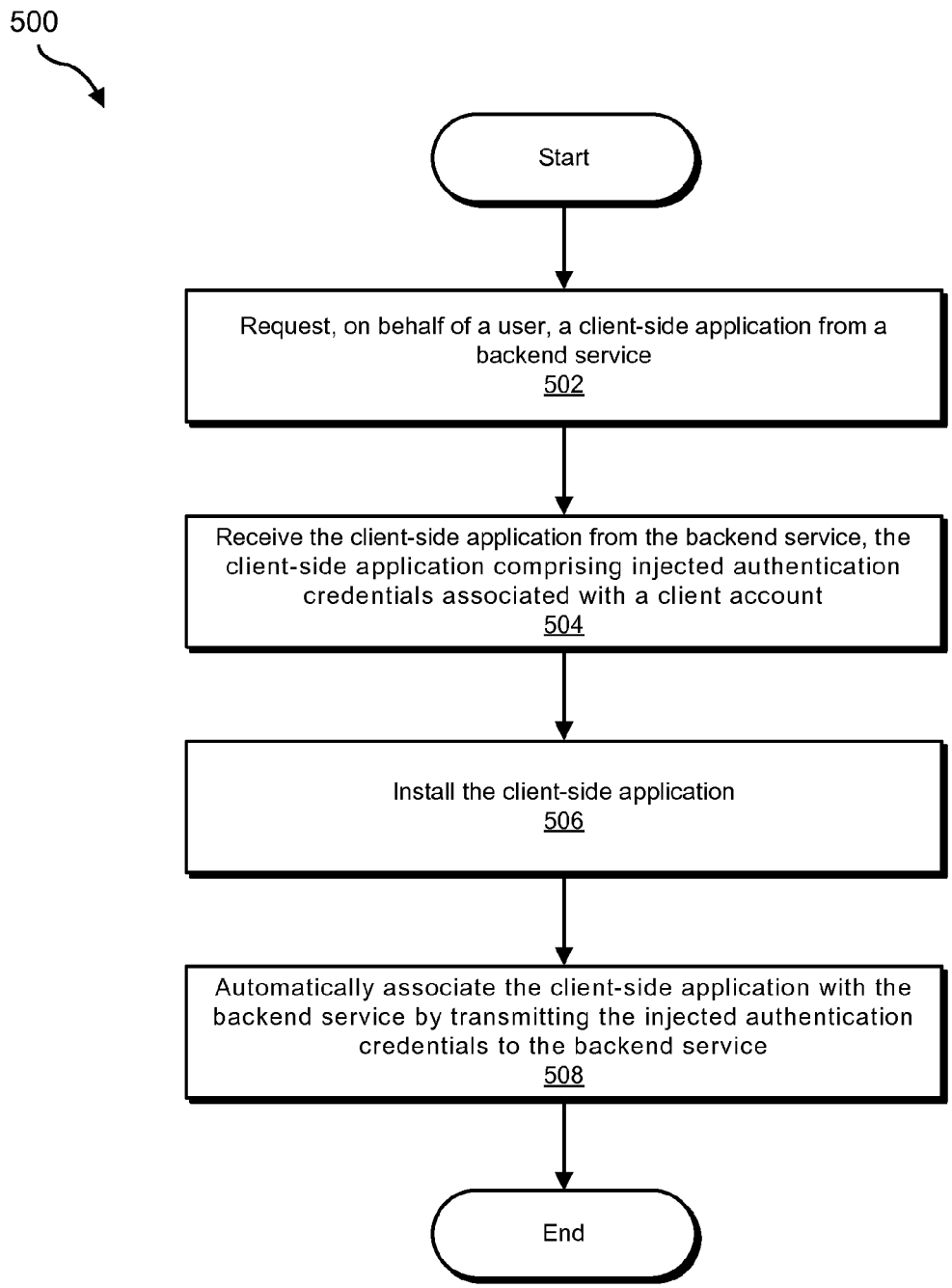
FIG. 5 is a flow diagram of an exemplary client-side method for automatically binding client-side applications with backend services.

As detailed above, the instant disclosure also identifies various systems and methods for automatically binding client-side applications with backend services. FIG. 5 is a flow diagram of an exemplary computer-implemented method 500 for performing such tasks. As illustrated in this figure, at step 502 the system may request, on behalf of a user, a client-side application from a backend service. For example, communication module 104 in FIG. 1 may cause client device 202 in FIG. 2 to transmit, on behalf of a user of client device 202, a request to backend service 206 for a client-side application.

As detailed above, the user of client device 202 may represent: 1) an owner of a client account associated with backend service 206 or 2) a user that has been associated with this client account by an owner of the client account. If the user of client device 202 represents a user that has been associated with the client account by an owner of the client account, then client device 202 may perform step 502 in response to receiving, via e-mail, a notification from backend service 206 that contains a hyperlink to a location for downloading the client-side application.

In addition, if the user of client device 202 represents a user (such as an employee or friend) that has been associated with the client account by an owner of the client account, then the request transmitted by client device 202 in step 502 may contain information that identifies the user of client device 202. Examples of such identification information include, without limitation, an e-mail address of the user, a temporary password assigned to the user, a personal message from the user (e.g., "Hi John, this is Russ"), or the like.

At step 504, the system may receive the requested client-side application from the backend service. For example, client device 202 in FIG. 2 may receive injected client-side application 404 in FIG. 4 from backend service 206 in FIG. 2 via network 204.

As detailed above, this client-side application may contain authentication credentials associated with the client account that were dynamically injected by the backend service in response to the request transmitted in step 502. As explained above, these injected authentication credentials may be associated with the client account that is associated with the user identified in step 502.

At step 506, the system may install the client-side application received in step 504. For example, client device 202 in FIG. 2 may install the injected client-side application 404 in FIG. 4 that was received from backend service 206 in step 504.

At step 508, the injected client-side application may automatically associate itself with the backend service by transmitting the injected authentication credentials to the backend service. For example, injected client-side application 404 in FIG. 4 may, upon being installed on client device 202 in FIG. 2, transmit its injected authentication credentials to backend service 206. Client device 202 may then receive an association-approval notice from backend service 206 that indicates that the client-side application was successfully associated or bound with the client account identified in the injected authentication credentials. Upon completion of step 508 in FIG. 5, exemplary method 500 may terminate.

In some examples, the system may automatically associate the client-side application with the backend service by: 1) receiving, from the backend service, an association-rejection notice for the client account identified in the injected authentication credentials, 2) initiating a manual-authentication process for a second client account, and then 3) associating the client-side application with the backend service by transmitting authentication credentials for the second client account the backend service. For example, if client device 202 in FIG. 2 receives an association-rejection notice from backend service 206 (due to the credentials being expired or because the account owner rejected the proposed association), then client device 202 may prompt a user of client device 202 to manually provide authentication credentials for a second client account. Client device 202 may then transmit the account credentials for the second client account to backend service 206.

As explained above, the client-side application received in step 504 may also contain rules and policies for managing the functionality and use, respectively, of the client-side application. In this example, these injected rules and policies may manage the functionality and/or use of the client-side application on client device 202 in FIG. 2.

In some examples, the system may, prior to automatically associating the client-side application with the backend service in step 508, present information to the user that identifies the client account. For example, prior to automatically associating a client-side application on client device 202 with backend service 206, the client-side application may display information to a user of client device 202 that identifies the client account in question. For example, client-side application may generate a graphical user interface that displays a message that states "By installing this application, you will be associated with John's account. Would you like to proceed?" By proceeding in this manner, the client-side application may avoid unintended or undesired associations.

As detailed above, the systems and methods disclosed herein may enable software publishers to easily distribute and automatically bind software applications with a single backend management system. In addition, these systems and methods may enable consumers and IT administrators to efficiently and securely share and/or distribute client-side applications that are associated with a single cloud-based client account.

Figure 6:
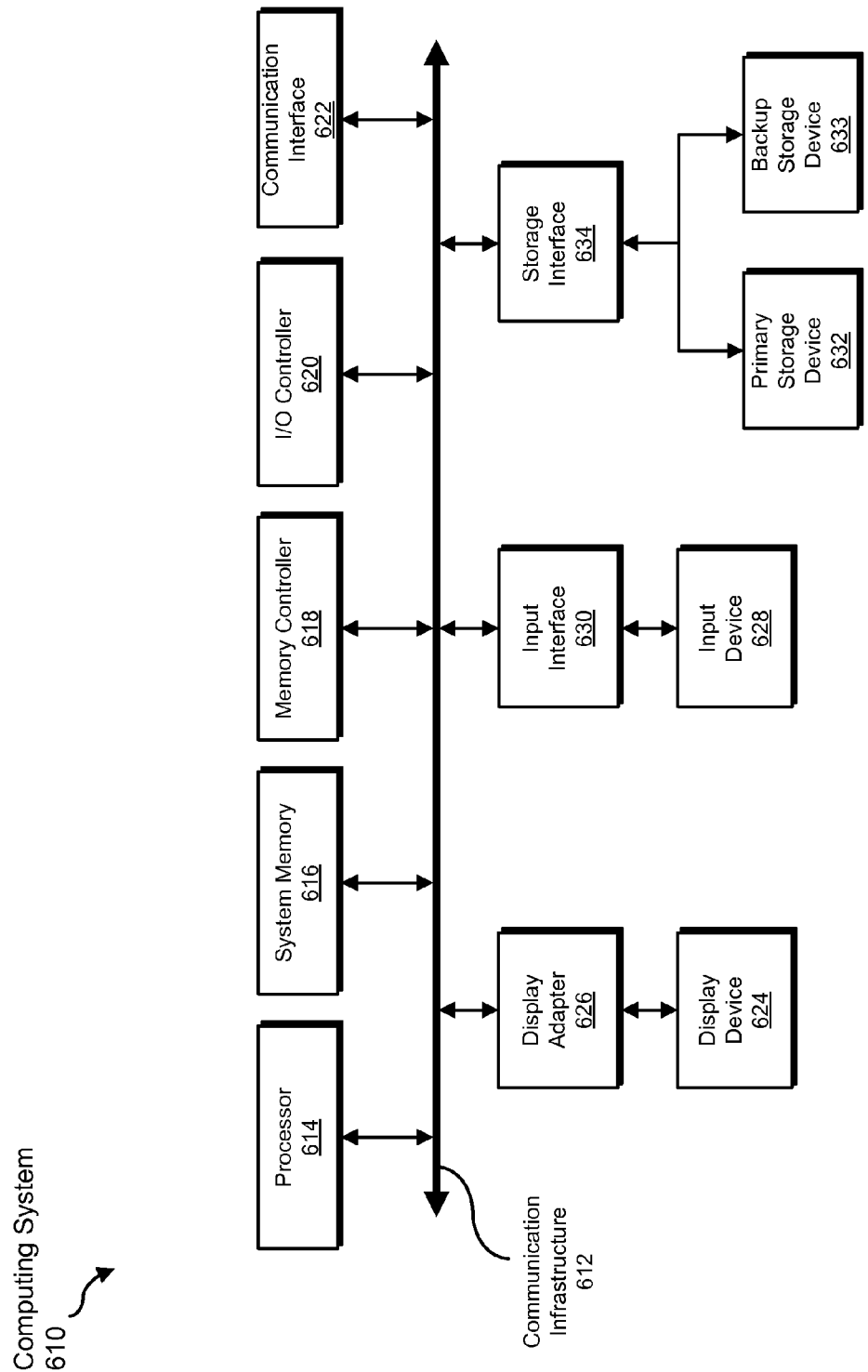
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the receiving, identifying, injecting, providing, associating, requiring, determining, declining, enabling, retrieving, installing, transmitting, managing, and presenting steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller may perform and/or be a means for performing, either alone or in combination with other elements, one or more of the steps or features described and/or illustrated herein, such as receiving, identifying, injecting, providing, associating, requiring, determining, declining, enabling, retrieving, installing, transmitting, managing, and presenting.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the receiving, identifying, injecting, providing, associating, requiring, determining, declining, enabling, retrieving, installing, transmitting, managing, and presenting steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 694 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the receiving, identifying, injecting, providing, associating, requiring, determining, declining, enabling, retrieving, installing, transmitting, managing, and presenting steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the receiving, identifying, injecting, providing, associating, requiring, determining, declining, enabling, retrieving, installing, transmitting, managing, and presenting steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the receiving, identifying, injecting, providing, associating, requiring, determining, declining, enabling, retrieving, installing, transmitting, managing, and presenting steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
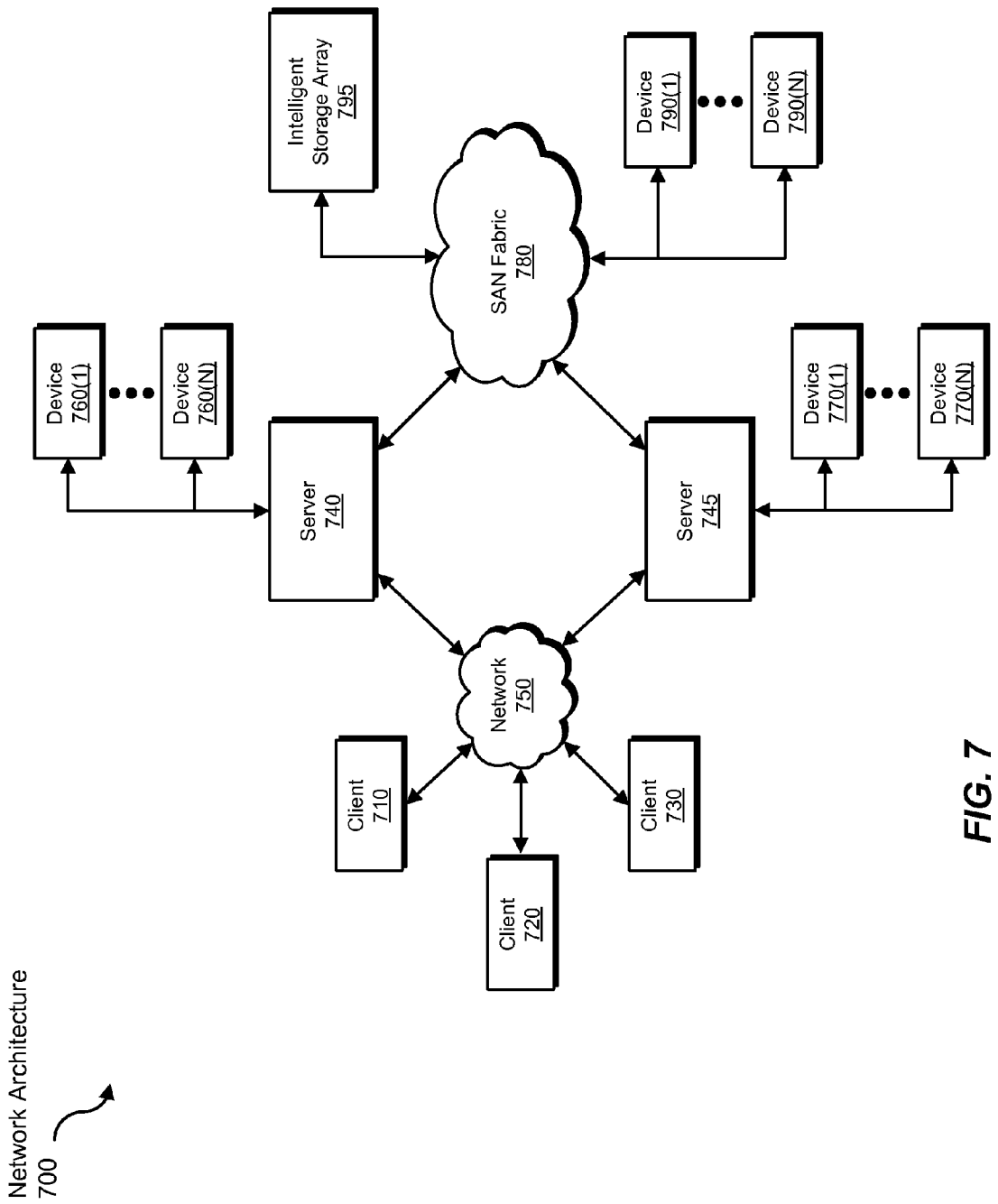
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing one or more of the steps disclosed herein, such as receiving, identifying, injecting, providing, associating, requiring, determining, declining, enabling, retrieving, installing, transmitting, managing, and presenting. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for automatically associating client-side applications with backend services. In one example, a method for performing such a task may comprise: 1) receiving a request from a user to obtain a client-side application, 2) identifying a client account associated with the user, 3) identifying authentication credentials associated with the client account, 4) dynamically injecting, in response to the request, the authentication credentials into the client-side application, and then 5) providing the injected client-side application to the user.

In one example, the user may be an owner of the client account and the request may comprise a request to download the client-side application. In another example, the method may further comprise, prior to receiving the request from the user, receiving a request from an owner of the client account to associate the user with the client account. The method may also comprise, upon receiving the request from the owner of the client account, transmitting, via email, a notification to the user that contains a hyperlink to a location for downloading the client-side application. In addition, the method may comprise receiving identification information from the user.

In one example, the method may also comprise, after providing the injected client-side application to the user: 1) receiving the authentication credentials from the client-side application and then 2) associating the client-side application with the client account. In this example, the method may also comprise, prior to associating the client-side application with the client account, requiring that an owner of the client account approve association of the client-side application with the client account.

In some examples, the method may further comprise, after providing the injected client-side application to the user: 1) receiving the authentication credentials from the client-side application, 2) determining that the authentication credentials have expired, and then 3) declining to associate the client-side application with the client account. The method may also comprise enabling an owner of the client account to disassociate the user from the client account and/or associate additional users with the client account.

In one embodiment, identifying the authentication credentials associated with the client account may comprise receiving the authentication credentials from an owner of the client account and/or retrieving the authentication credentials from a database. In addition, dynamically injecting the authentication credentials into the client-side application may also comprise injecting, into the client-side application, at least one rule for managing functionality of the client-side application and/or at least one policy for managing use of the client-side application. In some examples, dynamically injecting the authentication credentials into the client-side application may comprise injecting the authentication credentials without altering a digital signature associated with the client-side application.

Similarly, a corresponding client-side method for automatically binding or associating client-side applications with backend services may comprise: 1) requesting, on behalf of a user, a client-side application from a backend service, 2) receiving the client-side application from the backend service, the client-side application comprising authentication credentials that were dynamically injected into the client-side application by the backend service in response to the request, the authentication credentials being associated with a client account associated with the user, 3) installing the client-side application, and then 4) automatically associating the client-side application with the backend service by transmitting the injected authentication credentials to the backend service.

The client-side application may also comprise: 1) at least one rule, which was dynamically injected into the client-side application by the backend service in response to the request, for managing functionality of the client-side application and/or 2) at least one policy, which was dynamically injected into the client-side application by the backend service in response to the request, for managing use of the client-side application. In this example, the method may also comprise managing functionality of the client-side application in accordance with the rule and/or managing use of the client-side application in accordance with the policy.

In some examples, the method may also comprise, prior to requesting the client-side application from the backend service, receiving, via email, a notification that contains a hyperlink to a location for downloading the client-side application. The method may also comprise, prior to automatically associating the client-side application with the backend service, presenting information that identifies the client account to the user.

In one example, the request may contain identification information that identifies the user. In addition, the client account may represent a first client account and automatically associating the client-side application with the backend service may comprise: 1) receiving an association-rejection notice for the first client account from the backend service, 2) initiating a manual-authentication process for a second client account, and then 3) associating the client-side application with the backend service by transmitting authentication credentials for the second client account to the backend service.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for automatically binding client-side applications with backend services, at least a portion of the method being performed by a computing system comprising at least one processor, the method comprising:
    receiving a request from a user to obtain a client-side application that relies on services provided by a backend service;
    identifying a client account associated with the user that is provided by the backend service;
    identifying authentication credentials associated with the client account;
    dynamically injecting, in response to the request, the authentication credentials associated with the client account into the client-side application to enable the client-side application to automatically associate itself with the client account provided by the backend service without requiring the user to provide the authentication credentials associated with the client account to the backend service;
    providing the injected client-side application to the user.

2. The method of claim 1, wherein the user is an owner of the client account and the request comprises a request to download the client-side application.

3. The method of claim 1, further comprising, prior to receiving the request from the user, receiving a request from an owner of the client account to associate the user with the client account.

4. The method of claim 3, further comprising, upon receiving the request from the owner of the client account, transmitting, via email, a notification to the user that contains a hyperlink to a location for downloading the client-side application.

5. The method of claim 3, further comprising receiving identification information from the user.

6. The method of claim 1, further comprising, after providing the injected client-side application to the user:
    receiving the authentication credentials from the client-side application;
    associating the client-side application with the client account.

7. The method of claim 6, further comprising, prior to associating the client-side application with the client account, requiring that an owner of the client account approve association of the client-side application with the client account.

8. The method of claim 1, further comprising, after providing the injected client-side application to the user:
receiving the authentication credentials from the client-side application;
determining that the authentication credentials have expired;
declining to associate the client-side application with the client account.

9. The method of claim 1, further comprising enabling an owner of the client account to at least one of:
disassociate the user from the client account;
associate additional users with the client account.

10. The method of claim 1, wherein providing the injected client-side application to the user comprises transmitting the injected client-side application from the backend service to a client device.

11. The method of claim 1, wherein dynamically injecting the authentication credentials into the client-side application further comprises:
injecting, into the client-side application, at least one rule for managing functionality of the client-side application;
injecting, into the client-side application, at least one policy for managing use of the client-side application.

12. The method of claim 1, wherein dynamically injecting the authentication credentials into the client-side application comprises injecting the authentication credentials without altering a digital signature associated with the client-side application.

13. A computer-implemented method for automatically binding client-side applications with backend services, at least a portion of the method being performed by a computing device comprising at least one processor, the method comprising:
requesting, on behalf of a user, a client-side application that relies on services provided by a backend service;
receiving the client-side application from the backend service, the client-side application comprising authentication credentials that were dynamically injected into the client-side application by the backend service in response to the request, the authentication credentials being associated with a client account associated with the user that is provided by the backend service;
installing the client-side application;
automatically associating the client-side application with the client account provided by the backend service without requiring the user to provide the authentication credentials associated with the client account to the backend service by transmitting the injected authentication credentials to the backend service.

14. The method of claim 13, wherein the client-side application further comprises at least one of:
a rule, which was dynamically injected into the client-side application by the backend service in response to the request, for managing functionality of the client-side application;
a policy, which was dynamically injected into the client-side application by the backend service in response to the request, for managing use of the client-side application.

15. The method of claim 14, further comprising at least one of:
managing functionality of the client-side application in accordance with the rule;
managing use of the client-side application in accordance with the policy.

16. The method of claim 13, further comprising, prior to requesting the client-side application from the backend service, receiving, via email, a notification that contains a hyperlink to a location for downloading the client-side application.

17. The method of claim 13, further comprising, prior to automatically associating the client-side application with the client account provided by the backend service, presenting information to the user that identifies the client account.

18. The method of claim 13, wherein the request contains identification information that identifies the user.

19. The method of claim 13, wherein the client account comprises a first client account and automatically associating the client-side application with the client account provided by the backend service comprises:
receiving an association-rejection notice for the first client account from the backend service;
initiating a manual-authentication process for a second client account;
associating the client-side application with the second client account provided by the backend service by transmitting authentication credentials for the second client account to the backend service.

20. A system for automatically binding client-side applications with backend services, the system comprising:
a client device programmed to request, on behalf of a user, a client-side application that relies on backend services;
a backend service programmed to:
identify a client account associated with the user that is provided by the backend service;
identify authentication credentials associated with the client account;
dynamically inject, in response to the request, the authentication credentials associated with the client account into the client-side application to enable the client-side application to automatically associate itself with the client account provided by the backend service without requiring the user to provide the authentication credentials associated with the client account to the backend service;
provide the injected client-side application to the client device.

* * * * *